J. P. TARR.
SPIGOT.
APPLICATION FILED JUNE 1, 1910
986,520.
Patented Mar. 14, 1911.
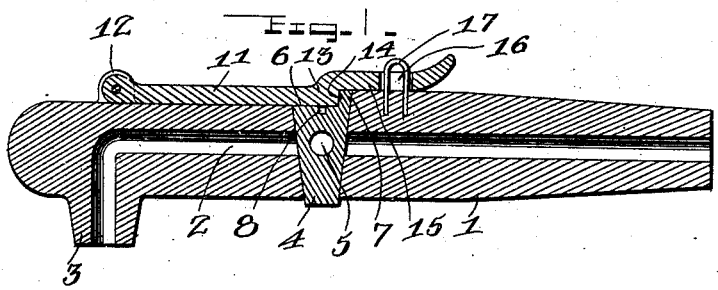
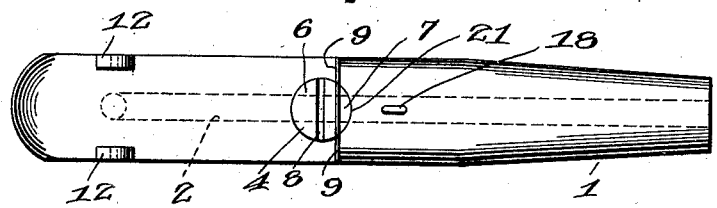
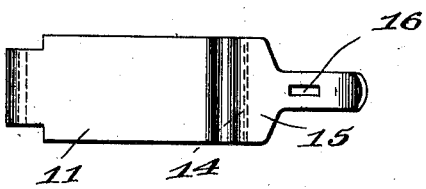
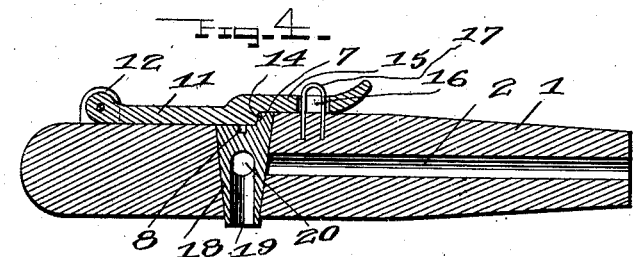
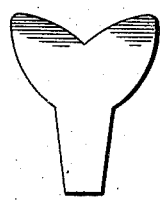
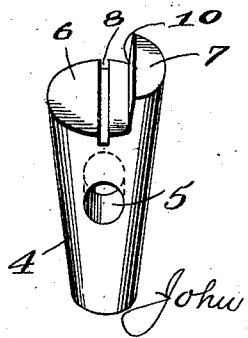
Witnesses
W. H. Rockwell
Lula D. Lindsay
Inventor
John P. Tarr
By Greeley & McIntire
Attorneys

UNITED STATES PATENT OFFICE.

JOHN P. TARR, OF JINGO, TENNESSEE.

SPIGOT.

986,520.  Specification of Letters Patent.  Patented Mar. 14, 1911.

Application filed June 1, 1910. Serial No. 564,508.

*To all whom it may concern:*

Be it known that I, JOHN P. TARR, a citizen of the United States, residing at Jingo, in the county of Williamson and State of Tennessee, have invented certain new and useful Improvements in Spigots; and I do hereby declare the following to be a full, clear, and exact description of the invention, such as will enable others skilled in the art to which it appertains to make and use the same.

My invention relates to key operated faucets of the type wherein means are provided for locking the rotary valve or plug of the faucet in its closed condition, so that the faucet may not be opened by unauthorized persons, and the object thereof is to provide a faucet of the type specified in which the rotary plug or valve will be more effectively locked in its closed position than has commonly been the case, and to provide a faucet which may be readily and cheaply manufactured and one which will be effective for the purposes for which it is designed.

With these objects in view, my invention consists in the improved faucet illustrated in the accompanying drawing, described in the following specification, and particularly claimed in the clauses of the concluding claim.

In the accompanying drawing, Figure 1 is a view showing a longitudinal central section of my improved faucet; Fig. 2 is a view showing the faucet in plan with the locking means therefor removed; Fig. 3 is a view showing a plan of a locking member or plate forming a part of my faucet; Fig. 4 is a view showing a longitudinal central section of a slightly modified form of faucet wherein my invention is embodied; Fig. 5 is a view showing a key for operating the rotary plug or valve of the faucet; and, Fig. 6 is a view showing the plug or valve of the faucet in perspective.

In the drawing, 1 is the body portion of my improved faucet, the same being tapered as shown so that upon being driven into a hole in a barrel or other receptacle a tight fit will be secured.

2 is a passage extending longitudinally of the body portion 1 and through which liquid may flow to a discharge spout 3, and 4 is a rotary valve of the type commonly referred to as a turning plug, the same having a passage 5 which may be brought into communication with the passage 2 by turning the valve, as will be understood. The upper end of the valve 4 is flat for the greater part of its area as shown at 6 but has an upwardly extending projection or ledge 7, and a slot 8 is provided which may be engaged by the key shown in Fig. 5 for the purpose of turning the valve.

The upper surface of the body portion 1 is formed in two different levels whereby a ledge is formed at 9 which extends transverse to the faucet body, and the vertically extending passage provided for the valve 4 is so located that the ledge 9 would extend across it, whereby the middle portion of the ledge is curved as at 21 and coincides with a part of the wall of the passage provided for the rotary valve, from which it follows that when the valve 4 is in place the projection or ledge 7 thereof will contact with the curved portion of the ledge 9 and the plane surface 10 thereof will be in the same vertical plane as the flat end portions of the ledge 9, as will be understood from Fig. 2. The upper surface of the projection 7 lies in the higher and the larger surface 6 in the lower of the two levels in which the upper surface of the body portion is formed as shown in Fig. 1.

11 is a swinging locking member hinged to the body portion between two lugs 12, 12 and the end of which at 13 engages the flat portion 6 of the valve 4 when the valve is locked. The end 13 of the locking member 11 is formed with a transversely extending shoulder at 14, which, when the valve is locked in its closed position, lies opposite and substantially in contact with the ledge 9 of the body portion and with the vertical face 10 of the projection 7 of the valve 4. The locking member 11 is provided with a projecting hasp 15 which extends across the upper end of the projection 7 and which hasp is provided with a hole 16 adapted to fit over a staple 17 so that the locking member may be locked in the position shown in Figs. 1 and 4 by means of a padlock.

The modified form of my faucet shown in Fig. 4 differs from the form shown in Fig. 1 in that the valve 18 has a downwardly extending passage 19 communicating with a transverse passage 20, the result being that a faucet is procured in which the discharge of liquid is through the valve itself instead of through a separate spout as in the form shown in Fig. 1.

From the above it will be understood that when the locking member 11 is in the position shown in the drawing the entire upper surface of the valve 4 will be engaged by the locking member whereby upward displacement of the valve will be prevented. The shoulder 14 thereof being in engagement with the projection 7 of the valve will prevent the same from turning, and the fact that this shoulder engages also the end portions of the ledge 9 upon both sides of the valve affords additional security to the locking mechanism.

Having thus described my invention and explained the operation thereof, I claim and desire to secure by Letters Patent:

1. In a faucet, a body portion having a passage extending longitudinally thereof and a second passage extending through the body portion and designed to receive a rotary valve for controlling the flow through said longitudinal passage; a ledge extending transverse to said body portion and located at the upper end of said second passage so that the middle portion of said ledge will be curved and will coincide with a part of the wall of said passage; a locking member hinged to said body portion and having a transversely extending shoulder adapted to be in substantial contact with the ledge upon said body portion when the locking member is in position to prevent the rotary valve from turning; and a rotary plug valve located in the second passage aforesaid and having an upwardly extending projection adapted to lie in the space between the shoulder of said locking member and the curved portion of said transverse ledge when the plug valve is in position to interrupt flow through said longitudinal passage.

2. In a faucet, a body portion having a passage extending longitudinally thereof, a rotary valve adapted to control the flow of fluid through said passage, the valve having a recess in its upper end for receiving a key, a hinged locking member supported by said body portion adapted to cover the upper end of the valve and to hold the valve in closed position, and means whereby the locking member may be secured in its locking position.

3. In a faucet, a body portion having a passage extending longitudinally thereof, a rotary valve adapted to control the flow of fluid through said passage, the valve having a recess in its upper end for receiving a key, a projection on the upper end of the valve, a locking member hinged to said body portion adapted to cover the upper end of the valve and having a shoulder for engaging said projection to hold the valve in closed position, and means whereby the locking member may be secured in its locking position to said body portion.

In testimony whereof I affix my signature in presence of two witnesses.

JOHN P. TARR.

Witnesses:
MATTIE A. ALLEN,
IDA E. DEAL.

---

Copies of this patent may be obtained for five cents each, by addressing the "Commissioner of Patents, Washington, D. C."